United States Patent [19]

Ryan

[11] Patent Number: 4,706,849
[45] Date of Patent: Nov. 17, 1987

[54] DEVICE FOR DISPENSING A PET FOOD FROM A SEALED CAN CONTAINER THEREFOR

[76] Inventor: Michael C. Ryan, P.O. Box 426, Mitchellville, Iowa 50169

[21] Appl. No.: 894,629

[22] Filed: Aug. 8, 1986

[51] Int. Cl.⁴ .................. B67B 7/24; B65D 83/00
[52] U.S. Cl. .................. 222/80; 222/325; 222/354; 222/398
[58] Field of Search .............. 222/80, 82–83, 222/85–86, 173, 183–185, 205, 251–252, 263, 325, 344–345, 354, 361, 394, 397–398, 441, 478

[56] References Cited

U.S. PATENT DOCUMENTS

| | | | |
|---|---|---|---|
| 489,554 | 1/1893 | Cantwell | 222/398 |
| 901,868 | 10/1908 | Bateman | 222/345 |
| 2,322,808 | 6/1943 | Hothersall | 222/86 X |
| 2,983,408 | 5/1961 | Schwartz | 222/361 X |
| 3,926,339 | 12/1975 | Openchowski | 222/83 |
| 4,365,440 | 12/1982 | Lenardson | 222/398 X |
| 4,394,941 | 7/1983 | Recine | 222/361 X |

Primary Examiner—Joseph J. Rolla
Assistant Examiner—Michael S. Huppert
Attorney, Agent, or Firm—Rudolph L. Lowell

[57] ABSTRACT

The dispensing device has an open ended cylinder member for receiving a can container having an open end supported on an annular shoulder at one end of the cylinder member. A cup shaped piston, extendible and retractible relative to the other end of the cylinder member carries a piercing member to pierce a hole in the closed end of the can on an initial retraction of the cup shaped piston within the cylinder member. A second retraction of the piston applies a pressure on the material in the can for discharge from its open end into a material receiving chamber from where it is ejected into a feeding dish. An air bleed hole in the piston is open during the piercing operation and manually closed when material is to be discharged from the can.

4 Claims, 7 Drawing Figures

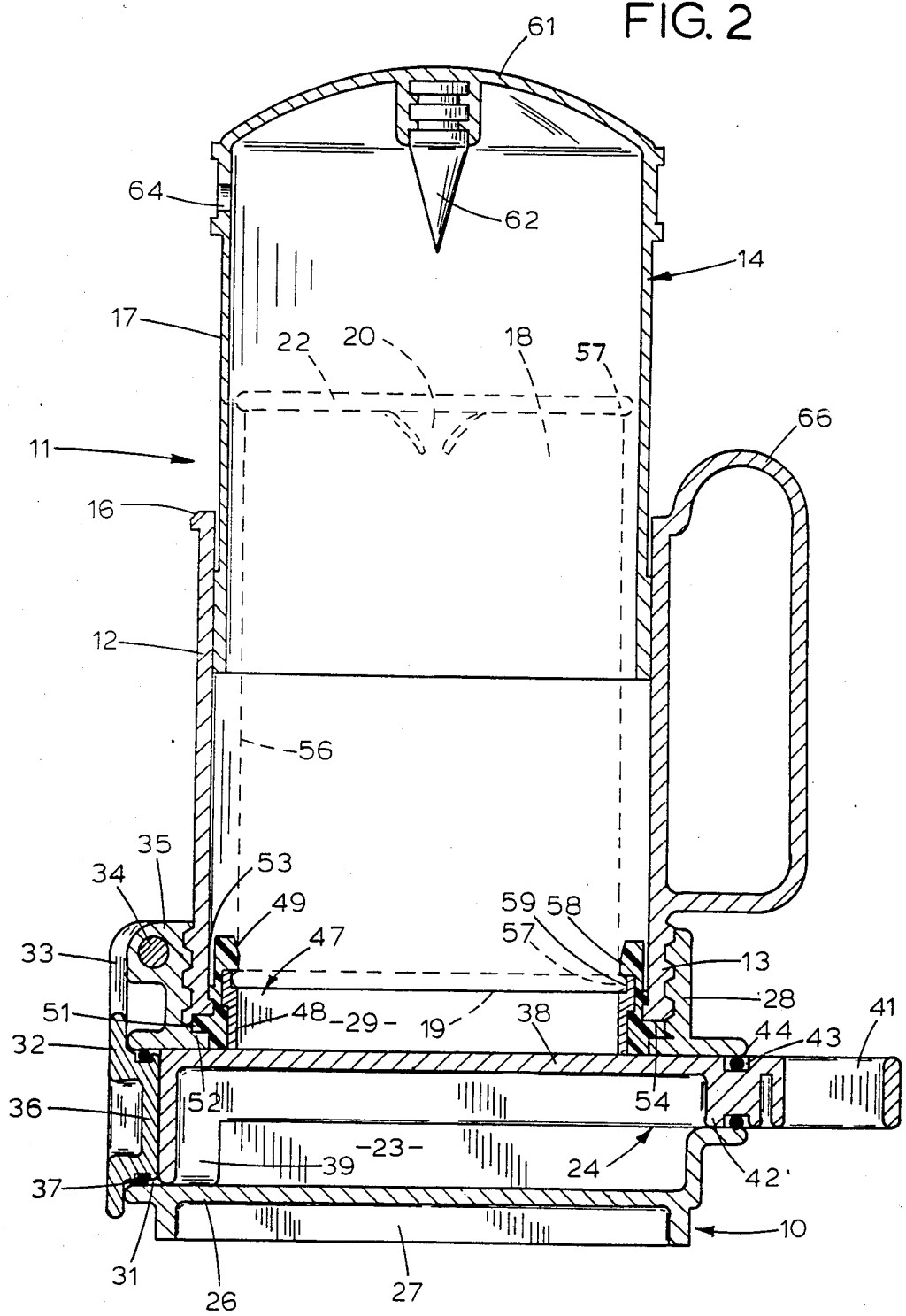

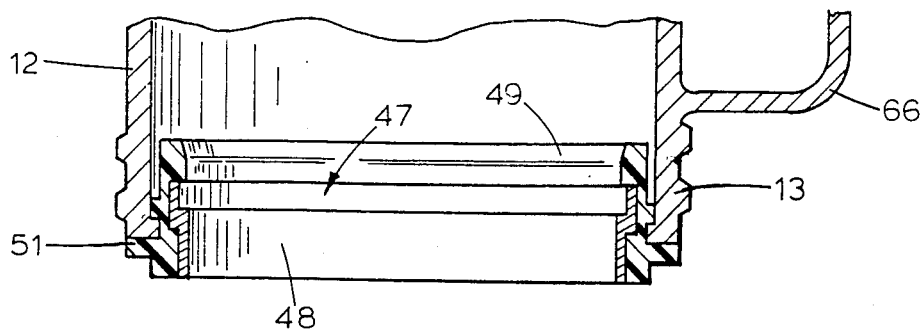
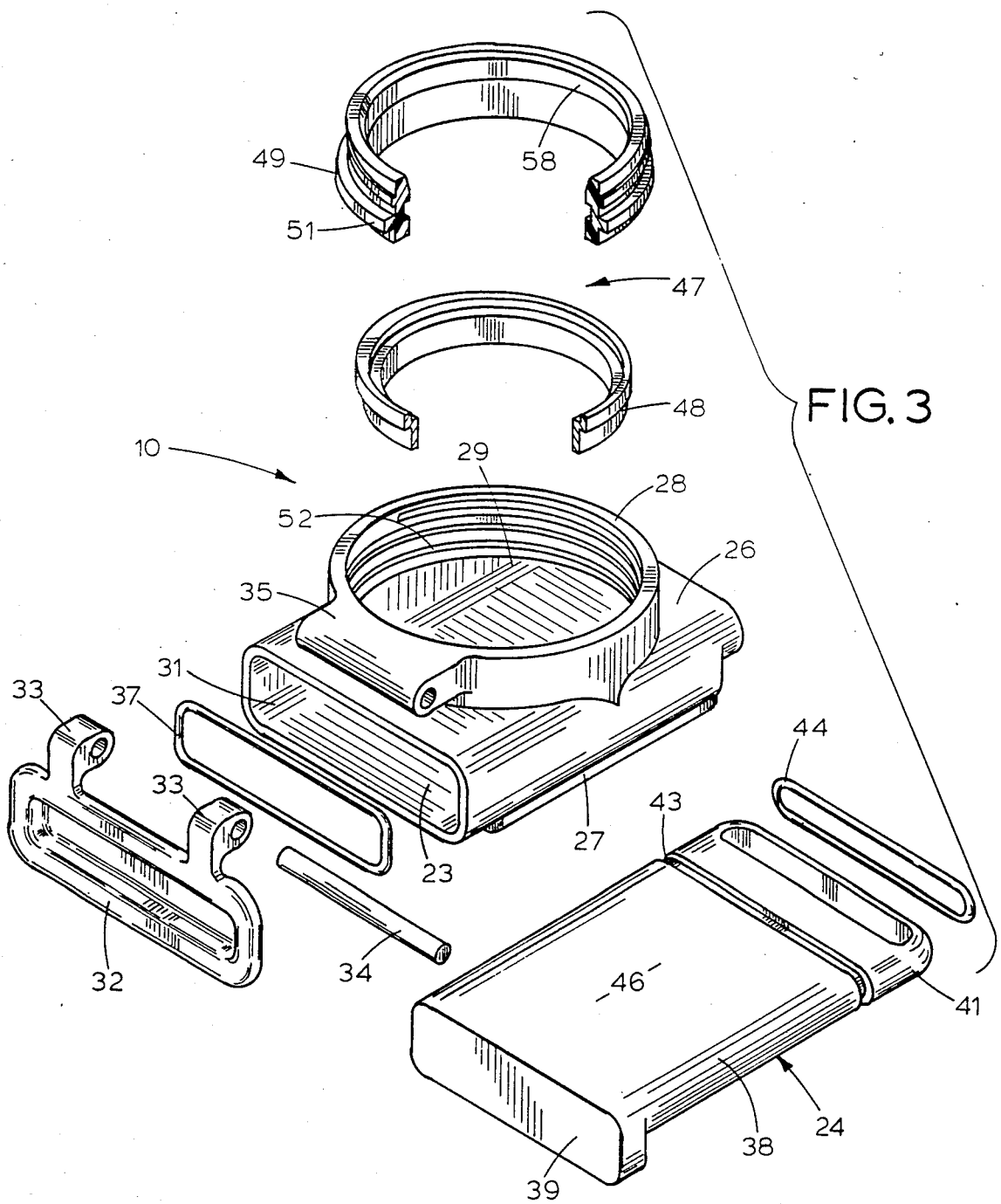

DEVICE FOR DISPENSING A PET FOOD FROM A SEALED CAN CONTAINER THEREFOR

This invention relates to a device for dispensing a material from a sealed metal cylindrical container therefor and in particular to a device for dispensing a pet food in successive portions or in its entirety from the container.

BACKGROUND OF THE INVENTION

Pet food for animals is generally commercially available in metal cans of a cylindrical shape and wherein at least one end of the can has a peripheral outwardly projected bead or rim. In a feeding operation, one end of the can is opened and the pet food removed by a spoon or the like for placement into a feeding dish. Since pet foods tend to have an objectionable odor and a tendency to cling to the spoon and inner wall of the can, storage of the open can and spoon creates odor problems. Additionally, when only a portion of the material in the can is fed, the feeding of following portions is not only messy and inconvenient but care must be exercised to avoid injury from sharp surfaces that may be at the open end of the can. These disadvantages in the feeding of animal pets are substantially avoided by the dispensing device of this invention.

SUMMARY OF THE INVENTION

The pet food dispensing device of this invention is of a simple and economical construction and efficient in operation to dispense a portion or the full contents of a can of pet food into a feeding dish in a minimum of time and without any manual contact with the food. On completion of a feeding operation the can and remaining food therein is retained in the dispenser in a substantially fluid sealed condition to facilitate storage for later use without leakage and objectionable odors. Successive feeding operations are made easily and quickly without removal of the can from the dispensing device. When the can is empty the device, without the use of any tools, is readily disassembled for cleaning purposes and then assembled for reuse with a new can of pet food. All of the parts are formed of a plastic or non-corrosive material for easy cleaning and prolonged use.

DESCRIPTION OF THE DRAWINGS

FIG. 2 is a longitudinal sectional view of the dispensing device as seen along the line 2—2 in FIG. 1;

FIG. 3 is an exploded perspective view of the base assembly of the dispensing device shown with a coacting can supporting ring unit;

FIG. 7 shows a modified form of the invention.

DETAILED DESCRIPTION OF THE PREFERRED EMBODIMENT

Figure 1:
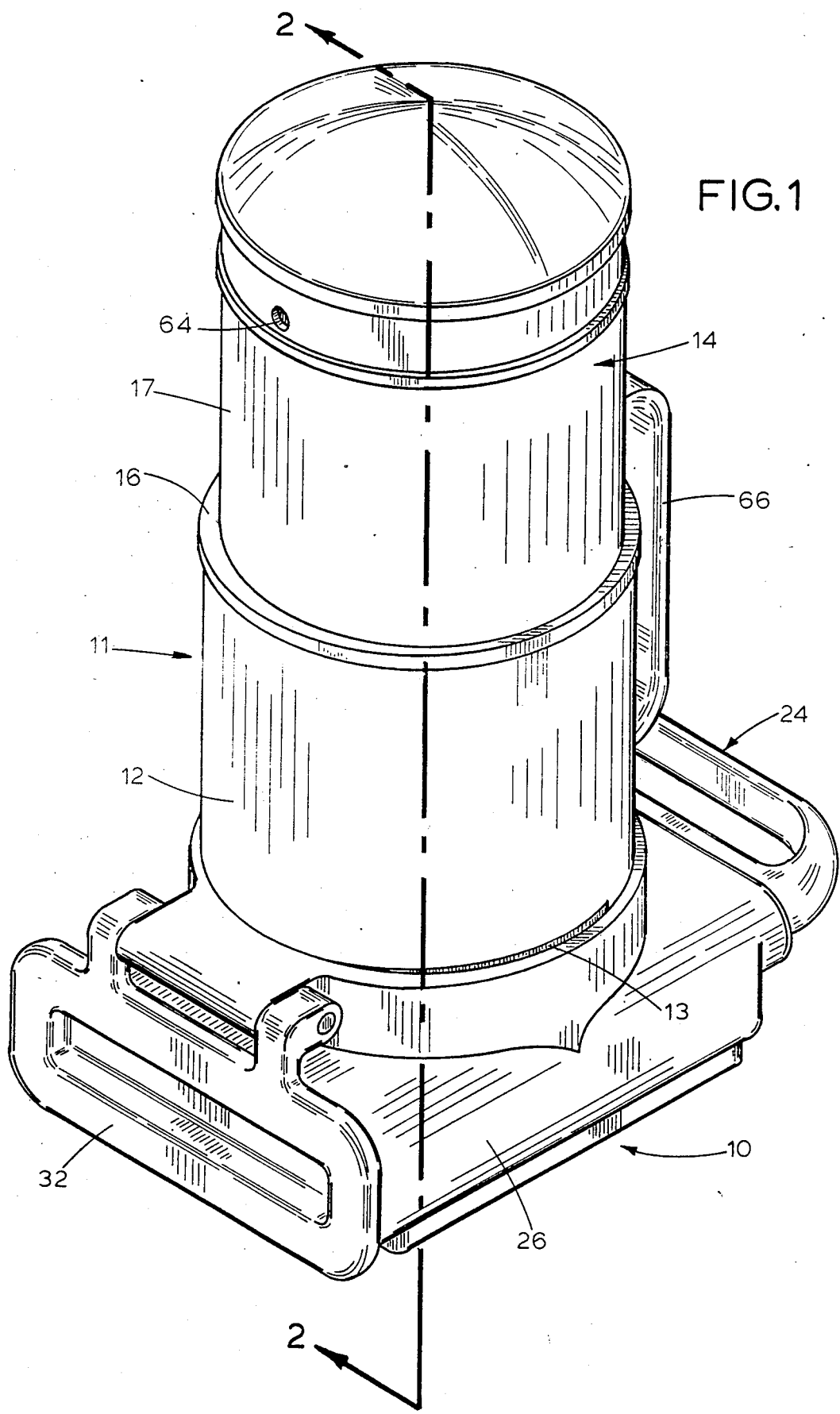
FIG. 1 is a perspective view of the dispensing device of this invention.

With reference to the drawings, the dispensing device of this invention is shown in FIGS. 1 and 2 as being comprised of a base assembly 10 and a cylinder assembly 11 that includes a tubular outer cylinder 12 having an externally threaded end 13 secured to the base assembly 10. A piston cap 14 at the opposite end 16 of the outer cylinder 12 has a skirt portion 17 mounted in a telescopic relation within the cylinder 12 for extension and retraction from the cylinder end 16. A food containing metal can 18 (FIG. 2) is receivable in the cylinder 12 with an open end 19 supported at the cylinder end 13. On retraction of the piston cap 14 within the cylinder 12, air under pressure is applied through a bleed hole 20 in the closed end 22 of the can 18 and against the food therein whereby to discharge a portion of the food from the open can end 19 into a receiving chamber 23 formed in the base assembly 10. The discharged food is then ejected from the chamber 23 into a feed dish or bowl 72 FIG. (6) by manipulation of a pusher or ejecting unit 24.

The base assembly 10 (FIGS. 2 and 3) includes a one-piece base member 26 of a generally flat tubular construction that forms the food receiving chamber 23. A supporting leg 27 extends about and projects downwardly from the lower side of the base member 26. Projected upwardly from the top side of the base member is an annular internally threaded flange or wall 28 which defines a circular opening 29 in the top side of the base member 26 that is open to the food receiving chamber 23 in the base member 26.

The food chamber 23 is of a generally rectangular shape in transverse cross section with an opening 31 in one end closed by a pivoted cover plate 32 of a rectangular shape corresponding to the cross-sectional shape of the receiving chamber. The cover 32 is formed with upstanding ears or lugs 33 for pivotal attachment by a pin 34 to a base member 35 projected laterally from the annular wall 28. As shown in FIGS. 2, the cover plate 32 has a plug portion 36 on the inner side thereof for extension within the opening 31 of the chamber 23 when the cover is in a closed position. A sealing ring 37, mounted about the plug 36, prevents leakage of any food material or moisture from the chamber 23 when the cover plate 32 is in the closed position therefor.

The material ejector unit 24 (FIGS. 2 and 3) has an elongated generally flat body member 38 that is slidably movable within and across the receiving chamber 23. The body member 38 is integrally formed at one end with a pusher blade 39 which is of a size and shape corresponding to the transverse size and shape of the chamber 23. The opposite end of the body member 38 has a handle portion 41. The body member is movable into the chamber 23 through the opening 31 thereof for extension of the handle 41 outwardly from the opposite end of the chamber 23 through an opening 42.

As shown in FIG. 2, the ejector unit 24 when extended across the opening 29 functions as a cut off valve between the cylinder end 13 and the chamber 23. In this moved position of the ejector unit 24, the pusher blade 39 is adjacent the chamber opening 31 and the handle 41 is located adjacent to but outwardly from the chamber opening 42. Within the opening 42, the body member 38 is formed with a plug section 43 that carries a sealing ring 44.

It is seen, therefore, that when the body member 38 is in its cutoff position at the opening 29, and the cover plate 32 is closed, the chamber openings 31 and 42 are fluid sealed by the sealing rings 37 and 44, respectively. Registration of the opening 29 with the chamber 23 takes place when the ejector unit 24 is fully extended from the chamber 23 so that the pusher blade 39 is located adjacent to the opening 42. As shown in FIG. 3, the body member 38 has a flat side surface 46 which is in slidable engagement with the adjacent inner surface of the chamber 23 so that as material is ejected from the chamber 23 by the pusher blade 39, the opening 29 to the chamber 23 is progressively closed by the body member flat side 46.

Located within the opening 29, formed by the internally threaded annular rim 28 of the base member 26, is a ring unit 47 that includes an inner or support ring member 48 for engaging and supporting the open end 19 of the can member 18. The support ring 48 is interlocked with an outer or snap ring member 49 that coacts with the inner ring 48 to releasably lock the can end 19 on the inner or support ring 48. The outer ring 49 is formed with an outer peripheral flange 51 for resting engagement on an inner peripheral flange 52 formed at the base of the annular wall 28. The flange 51 engages the inner peripheral surface of the wall 28 and holds the ring unit 47 in a concentrically spaced relation within the annular wall 28. The concentric space 53, thus provided, permits the end 13 of the cylinder 12 to be threadably engaged to and within the annular wall 28 to a position wherein the lower edge 54 of the outer cylinder 12 abuts the flange 51 to seal the outer ring 49 against the flange 52 on the wall 28.

The can 18 (FIG. 2) is of a usual metal type in which the side wall 56 terminates at one or both ends in an outstanding peripheral bead or rim 57. With the end 19 of the can 18 initially opened or removed in any usual manner, the can is positioned within the cylinder 12 and urged against the locking ring 49 to force a snap portion 58 on the ring 49 to an open position for reception of the bead 57 at the open end of the can within a supporting groove 59 formed by the coacting ring members 48 and 49. With such bead 57 within the groove 59, the snap portion 58 is released for movement to its position for locking the lower bead 57 within the groove 59. The skirt 17 of the piston cap 14 is thus positioned about the can 18 and within the outer cylinder 12.

Figure 4:
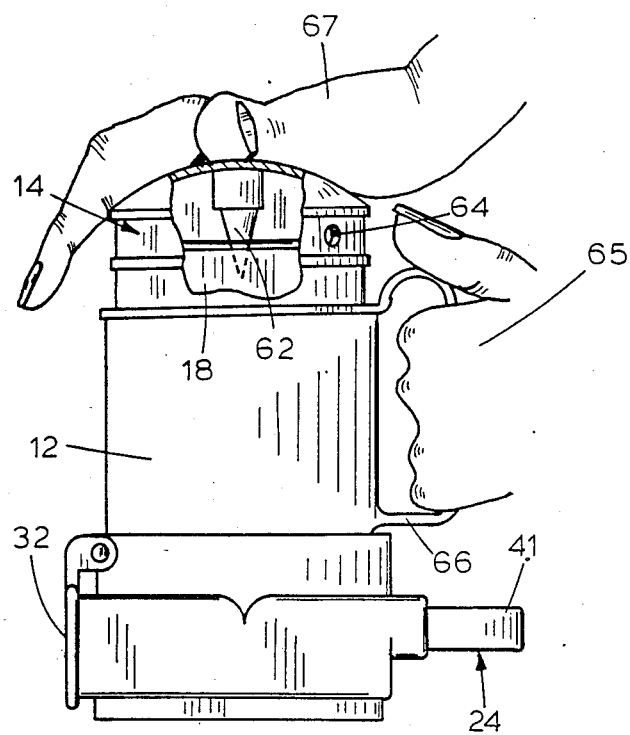
FIGS. 4, 5 and 6 illustrate diagrammatically successive steps in the use of the device in dispensing pet food material from a can container.

Projected downwardly from the top 61 of the piston cap 14 is a can piercing member 62. On retraction of the piston cap 14 within the cylinder 12, the member 62 forms the air bleed hole 20 in the closed end 22 of the food can 18. During this retractive movement of the piston cap 14, air is permitted to escape from within the cap through an air bleed hole 64 formed in the skirt portion 17 adjacent the top wall 61. During the can piercing operation, the ejector unit 24 is in a retracted position within the base member 26 and the cover plate 32 is in its position as shown in FIG. 4.

Figure 5:
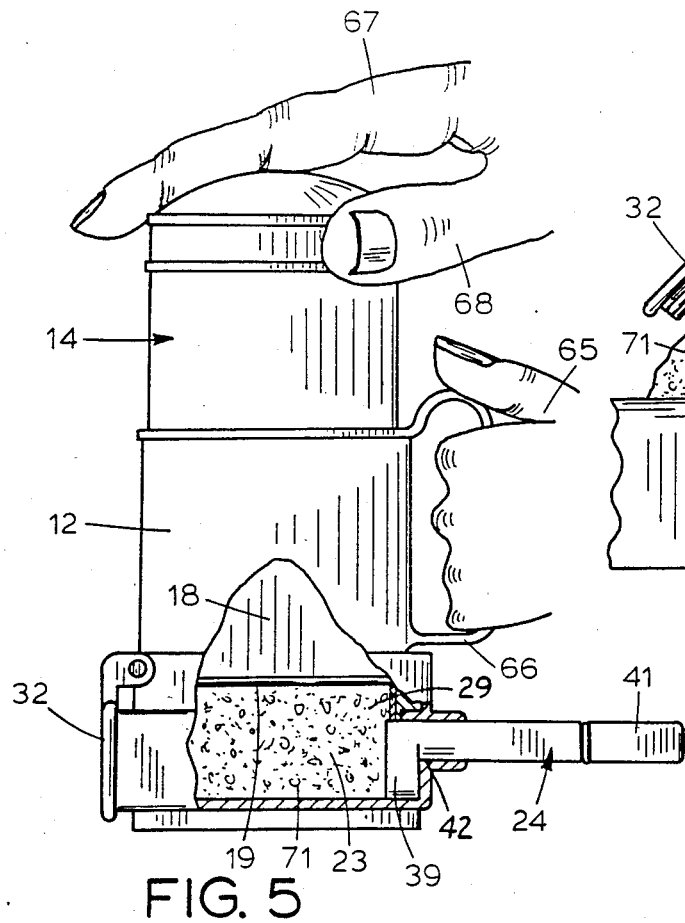

To discharge material from within the can 18, and as shown in FIG. 5, the piston cap 14 is extended from the cylinder 12 and the ejector unit 24 is moved to position the pusher blade 39 adjacent the chamber opening 42. With the device firmly held by one hand 65 at a handle 66 integrally formed on the outer cylinder 12, the other hand 67 is available to retract the piston cap 14 within the cylinder 12. With the cover plate 32 released and the bleed hole 64 closed by the thumb 68 on the cap operating hand 67, the piston cap 14 is retracted. The piston cap 14 then functions to compress air within the skirt portion 17 and above the can 18. The compressed or air under pressure is admitted into the can 18 through the bleed hole 20 for application against the food material within the can to force the material, indicated at 71, in FIG. 5, into the receiving chamber 23 through the opening 29.

Figure 6:
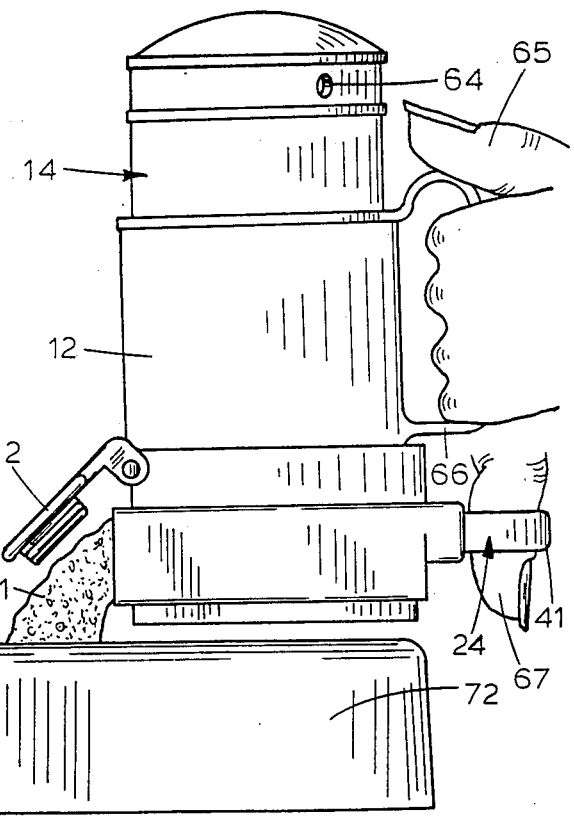

With the dispensing device still held in the one hand 65, the other hand 67 grasps the handle 41 on the body member 38 to move the pusher blade 39 toward the chamber opening 31. With the cover plate 32 in its open position (FIG. 6) movement of the pusher blade 39 separates the food material 71 in the chamber 23 from the food remaining in the can concurrently with the ejection of the material 71 through the chamber opening 31 and into a feeding dish 72 or the like. This dispensing operation may be repeated, if necessary, until the can is empty or the cover 32 may merely be moved to its chamber closing position. The chamber 23 would thus be fluid sealed at both ends thereof concurrently with the pusher blade 39 functioning to close the opening 42 and the open end of the can 18 (FIG. 2).

All of the elements of the food dispensing device are formed of a plastic material and with such elements being readily assembled and disassembled without requiring any special hand tools. As illustrated, the snap ring 49 of the ring unit 47 is of a resilient rubber-like composition. On emptying the can 18 of its contents, therefore, the device is readily disassembled to provide for the washing of all parts thereof so that the device is clean and sanitary to handle a second can of pet food or the like. If a feeding operation of a large pet animal should require the can 18 being emptied at one time of all material therein, the base assembly 10 may be threadably disengaged from the cylinder and removed from the device, as shown in FIG. 7. On retraction of the piston cap 14, material from the can is discharged directly into a dish 72, rather than into the material metering chamber 23. It is to be understood that the device is not limited to the dispensing of pet food and can also be used in emptying food cans containing jellied cranberries, some types of hash, certain congealed soup compositions and the like.

Although the invention has been described with respect to a preferred embodiment thereof, it is to be also understood that it is not to be so limited since changes and modifications can be made therein which are within the full intended scope of this invention as defined by the appended claims.

I claim:

1. A device for dispensing a non-fluent food material from a cylindrical can container having a peripheral bead rim at one end thereof and wherein the can has an air hole in the opposite end thereof and is open at the one end over the cross sectional area defined by said peripheral bead rim, said device comprising:
    (a) a cylindrical member and a removable piston cap member for the cylindrical member having a cylindrical skirt portion in a telescopic relation with one end of the cylindrical member, and
    (b) a can support means adjacent the other end of the cylindrical member for releasably engaging the peripheral bead rim of a can received in the cylindrical member in a supported position on the cylindrical member,
    (c) said piston cap member, when in a telescopic relation with the cylindrical member, being movable toward said other end of the cylindrical member to compress and apply air under pressure through said air hole and against the material in the can to extrude the material from the open end of the can over the cross sectional area thereof.

2. A device for dispensing a food material in accordance with claim 1, including:
    (a) means for severing a portion of the extruded material at the open end of the can to dispense only said portion from the can including a base assembly secured to the open end of said cylindrical member having a material receiving chamber means with an opening opposite the open end of the can, said opening having a cross sectional area substantially equal to the cross sectional area of said open end of the can,
(b) a material outlet in one side of said chamber means, and
(c) a material moving and severing member movably supported in said base assembly having a pusher blade in said chamber means movable from said one side to an opposite side of the chamber means,
(d) with the material extruded from the open end of the can into said chamber means being severed from the material in the can and pushed through said material outlet on movement of the pusher blade from said opposite side to the one side of the chamber means.

3. A device for dispensing a non-fluent material from a metal can of a cylindrical shape containing the material and having a peripheral bead rim at one end comprising:
(a) a can receiving means including a stationary cylindrical member and a piston cap member extendible and retractible from one end of said cylindrical member,
(b) a material receiving means secured to and open to the opposite end of said can receiving means, having a material outlet opening in one side thereof, and
(c) a material moving member movably supported in said material receiving means for movement across the material-receiving means toward and away from said outlet opening,
(d) said can formed in the one end thereof with an opening having a cross sectional area defined by said peripheral bead rim and in the opposite end thereof with an air hole, whereby when positioned in the can receiving means with the opposite end adjacent said one end of the cylindrical member, the material therein is extruded into said material receiving means on retraction of the piston cap member and ejected from the material receiving means on movement of said material moving member toward said outlet opening.

4. A device for dispensing a material from a metal can containing the material, said can having a closed end and an open end, comprising:
(a) a cylindrical can receiving means including a cylindrical member and a removable piston cap member for the cylindrical member having a cover portion and a cylindrical skirt portion in a telescopic relation with the cylindrical member for movement to extended and retracted positions relative to one end of the cylindrical member, said skirt portion having an air bleed opening therein adjacent said cover portion,
(b) a can piercing member secured to and projected from the inner side of said cover portion, and
(c) a support means adjacent the other end of the cylindrical member for supporting the open end of a can positioned in the cylindrical member,
(d) said piercing member, when said piston cap member is retracted from an initial extended position therefor, being movable to form an air bleed hole in the closed end of the can, and said piston cap member when retracted from a next extended position with the air bleed hole closed, applying an air pressure through said bleed hole on the material in the can to discharge material from said open end of the can.

* * * * *